United States Patent [19]

Kimura et al.

[11] 4,447,045

[45] May 8, 1984

[54] APPARATUS FOR PREPARING HIGH-MELTING-POINT HIGH-TOUGHNESS METALS

[75] Inventors: Etsuji Kimura; Katsumi Ogi; Kazusuke Sato, all of Saitama; Mayuki Hashimoto, Tokyo, all of Japan

[73] Assignee: Mitsubishi Kinzoku Kabushiki Kaisha, Tokyo, Japan

[21] Appl. No.: 485,057

[22] Filed: Apr. 14, 1983

[30] Foreign Application Priority Data

Jul. 21, 1982 [JP] Japan .................................. 57-125870
Mar. 4, 1983 [JP] Japan .................................. 58-34488

[51] Int. Cl.³ .......................................... C22B 61/02
[52] U.S. Cl. ..................................... 266/149; 266/905
[58] Field of Search ............... 266/186, 905, 187, 149, 266/168, 151, 150; 432/64; 75/84.5

[56] References Cited

U.S. PATENT DOCUMENTS 3,684,264 8/1972 Petrov et al. ..................... 266/905

4,105,192 8/1978 Ishimatsu et al. .................. 266/905

FOREIGN PATENT DOCUMENTS 1566363 4/1980 United Kingdom ............... 75/84.5

Primary Examiner—M. J. Andrews
Assistant Examiner—S. Kastler
Attorney, Agent, or Firm—Oblon, Fisher, Spivak, McClelland & Maier

[57] ABSTRACT

In an apparatus for preparation of high-melting-point high-toughness metals by reduction of chlorides thereof with an active metal which comprises a heatable and tightly closable reaction chamber, an evacuable and coolable condensation chamber for separating the unreacted active metal and the formed chloride of the active metal from the formed object metal and an intermediate connecting section for communicating and cutting off the two chambers, the improved apparatus which is characterized in that it comprises a seal pot closing means having a funnel and a pot which is closed by introducing a melt of a fusible and vaporizable material and solidifying it therein, is disclosed.

8 Claims, 7 Drawing Figures

APPARATUS FOR PREPARING HIGH-MELTING-POINT HIGH-TOUGHNESS METALS

TECHNICAL FIELD OF THE INVENTION

This invention relates to an apparatus for reduction of metal chlorides. Among the metallic materials, titanium and zirconium, which have high melting point and high toughness, are mainly produced by reduction of their chlorides with magnesium and are obtained in the form of a spongy mass. This invention is intended for improvement of apparatus for reduction of such metal chlorides.

BACKGROUND OF THE INVENTION

Preparation of sponge of these high-melting-point high-toughness metals is presently effected by using a reaction apparatus comprising a reaction chamber which can be tightly sealed and heated and a condensation chamber provided above the reaction chamber, and which can be cooled and evacuated. Using such an apparatus, a metal chloride (titanium tetrachloride for instance) is reacted with an active metal (magnesium, for instance) in the reaction chamber, whereafter the produced spongy metal is separated from the unreacted active metal and the chloride of the active metal, the latter two being removed by evacuation, and finally recovering the active metal chloride and the active metal in the condensation chamber.

Such an apparatus is, for instance, disclosed in Japanese Laying-Open Patent Publication No. 18717/72. In the apparatuses of this kind, it is a problem how to seal off the upper condensation chamber from the lower reaction chamber. In the apparatus of this laying-open patent publication, the passage of the intermediate connecting section connecting the reaction chamber and the condensation chamber is closed by a partition. But such a partition is defective not only in that it has a complicated structure but in that it gradually deforms suffering from thermal strain, resulting in imperfect closure.

Japanese Laying-Open Patent Publication No. 49922/77 discloses a similar apparatus in which the above-mentioned defect is partially eliminated. In this apparatus, the intermediate connecting section is closed during the reaction period by a lid of a fusible metal such as magnesium, aluminum, zinc, antimony, etc., which is fixed by means of bolts. And prior to the period of vacuum separation, the lid is removed by melting it by means of a suitably provided heating means, so that communication between the two chambers are restored. Although this apparatus eliminates the above-mentioned defect, it requires that a new lid with a smoothly finished plane surface must be prepared for each run. Therefore, this apparatus is not entirely satisfactory from the viewpoint of operation convenience and economy.

In the two apparatuses mentioned above are difficult in separating the reaction chamber at a high temperature and the condensation chamber. Therefore the reaction chamber must be hoisted together with the condensation chamber by means of a crane or the like when it is removed from the heating apparatus. Under the current circumstances that a larger capacity of a batch is being demanded, the above-mentioned inconvenience will be intensified.

It is the object of this invention to overcome the defects of the above-mentioned prior art apparatuses for reduction of chlorides of high-melting-point high-toughness metals comprising a reaction chamber and a condensation chamber connected together by means of an intermediate connecting section and to improve the function thereof by employing a seal pot structure in the connecting section as the closing means.

DISCLOSURE OF THE INVENTION

According to the present invention, there is provided in an apparatus for preparation of high-melting-point high-toughness metals by reduction of chlorides thereof with an active metal which comprises a heatable and tightly closable reaction chamber, an evacuable and coolable condensation chamber for condensing the unreacted active metal and the formed chloride vaporized in the reaction chamber to separate these from the formed object metal, and an intermediate connecting section for communicating and sealing off the two chambers, there is provided the improved apparatus characterized in that it comprises a seal pot closing means having a funnel provided in the connecting section and a pot for fusible and vaporizable sealing material which receives the lower pipe of the funnel and a heating means for melting and vaporizing the fusible and vaporizable material.

In a preferred embodiment of the above-described apparatus, the pot for fusible and vaporizable material is provided with a drain duct which extends to the outside of the intermediate connecting section and is provided with a valve means. The drain duct should preferably extend in a straight line so that a cleaning means can penetrate therethrough, although the invention is not restricted to such arrangement. The funnel and pot may be formed using a part of the wall of the intermediate connecting section as a part of the wall thereof as described in detail in the following.

The term "seal pot" used in this specification means a seal pot which has a conventional structure, but which is somewhat different from the conventional seal pot in that it uses a fusible and vaporizable normally solid material as the sealant. Sealants usable for the apparatus of this invention include metals such as magnesium, aluminum, zinc, antimony, etc., metal salts such as magnesium chloride, sodium chloride, potassium chloride and mixtures thereof. However, metals are generally preferred since they provide perfect sealing, and magnesium is particularly preferred since it does not contaminate the formed high-melting-point high-toughness metal (titanium, zirconium, etc.).

BRIEF EXPLANATION OF THE DRAWINGS

The invention will now be described by way of working examples with reference to the attached drawings wherein.

DESCRIPTION OF THE PREFERRED EMBODIMENTS

Example 1

Figure 1:
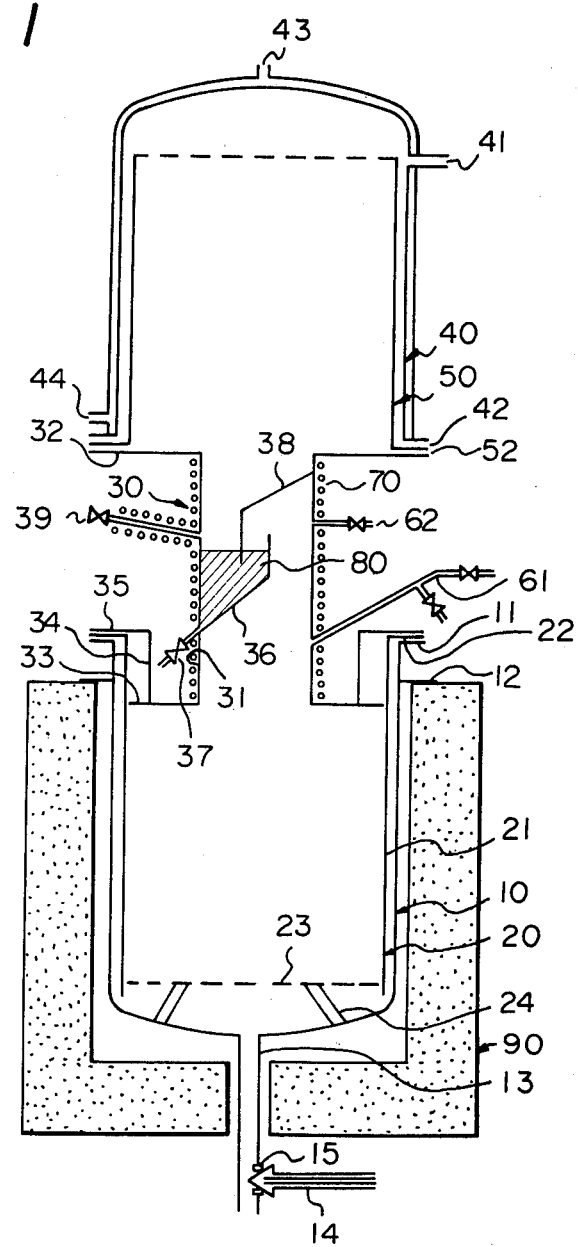
FIG. 1 is a vertical cross-sectional view of an embodiment of this invention schematically representing the concept of the invention.

FIG. 1 shows a first embodiment of the apparatus according to this invention, which comprises reaction chamber 10+20, an intermediate connecting section 30 and a condensation chamber 40+50. As shown in FIG. 1, the reaction chamber comprises a retort 10, which constitutes an external container, and an internal container 20 which comprises a side wall member 21 and a base plate 23 provided with at least one perforation and supporting legs 24.

The retort 10 can be of any shape, but the most practical shape is cylindrical. Thus the internal container 20 is also a cylinder, which is a little smaller than the retort. A flange 11 is provided at the top of the retort, and at a slightly lower portion thereof there is provided a rim 12, which serves to mount the retort on the heating oven. At the bottom of the retort, a means for taking out the formed chloride of the active metal is provided. This means comprises a tapping pipe 13 provided with a watercooled plug 14 and a bush 15 to receive the plug.

At the top of the cylindrical side wall member 21 of the internal container 20, is provided a flange 22 which rests on the flange 11 of the retort. The cylindrical member 21 and the bottom plate 23 are not fixed together but merely held in loose contact.

The intermediate connecting section 30 substantially comprises a cylindrical body 31 the diameter of which is substantially smaller than that of the cylindrical member 21 of the internal container 20. The intermediate connecting section 30 has a large flange 32 extending outward from its top end and another flange 33 extending outward from its bottomend. On the surface of the flange 33 is provided a short concentric cylindrical wall 34 having an outwardly extending flange 35 at its top edge. This flange 35 and the flange 11 of the retort 10 sandwich the flange 22 of the cylindrical member 21 of the internal container 20 therebetween. The diameter of the flange 33 at the bottom of the connecting section 30 is slightly smaller than the internal diameter of the cylindrical member 21 of the internal container 20. Thus the flange 33 fits into the cylindrical member 21 and loosely contacts the inside thereof.

The flange 35 of the intermediate connecting section 30, the flange 22 of the internal container and the flange 11 of the retort are laid one over another with gaskets therebetween and are fixed together by means of bolts or clamps. Gaskets of any known heat-resistive elastomer can be used.

The condensation chamber comprises a jacketed cooling chamber 40, which is similar to the retort 10 in shape, and a condensation cylinder 50 placed inside of the cooling chamber 40. The cooling chamber is provided with an exhaust outlet 41 and an inlet 44 and an outlet 43 for cooling water. The condensation cylinder 50 is a cylindrical container a little smaller than the cooling chamber 40 and has at least one perforation in the ceiling thereof for the free passage of gas. A flange 52 is formed at the bottom thereof as in the case of the cooling chamber 40. The flange 42 of the cooling chamber 40 and the flange 52 of the condensation cylinder 50 are fixed together with the flange 32 of the connecting section 30 with gaskets therebetween by means of bolts or the like. Thus the cooling chamber 40 and the condensation cylinder 50 are normally handled integrally as one body. The gaskets used between these flanges may be of any known heatresistive elastomer.

Figure 2:
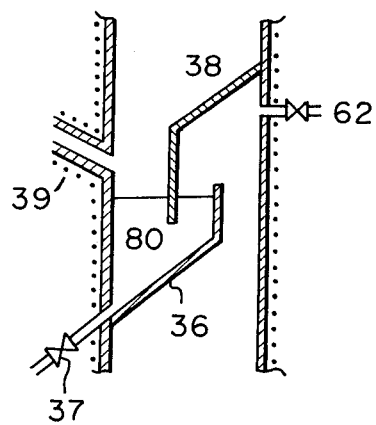
FIGS. 2 and 3 are enlarged cross-sectional views of the seal pot of the apparatus according to this invention.
Figure 3:
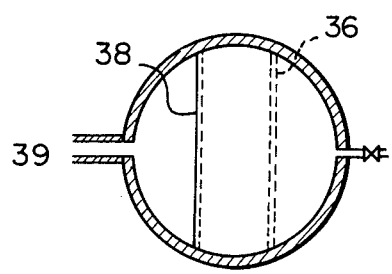
Figure 4:
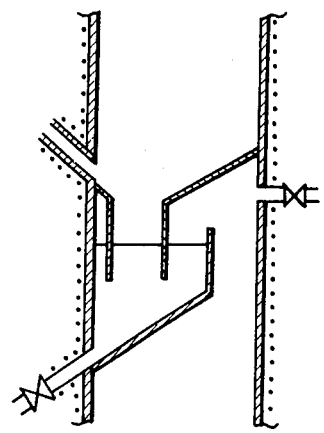
FIG. 4 is a vertical cross-sectional view showing the shape and the structure of another embodiment of the seal pot.
Figure 5:
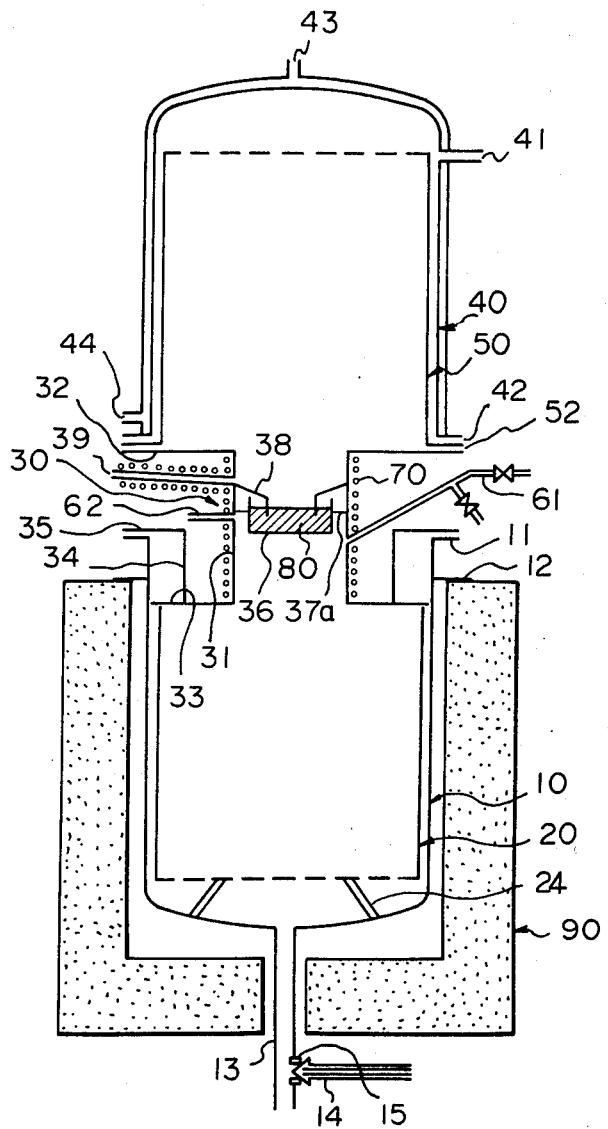
FIG. 5 is a vertical cross-section of the apparatus of another embodiment of this invention schematically representing the conception of the invention.
Figure 6:
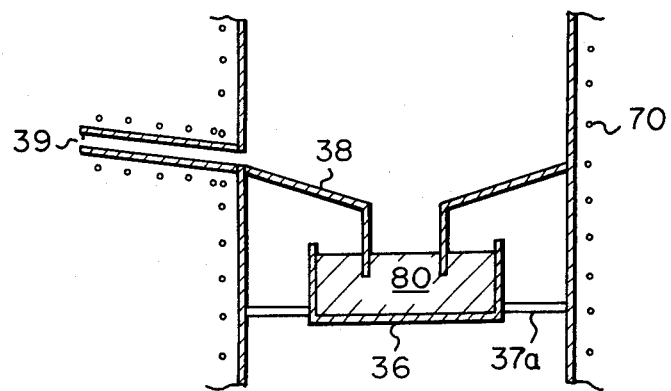
FIGS. 6 and 7 are enlarged cross-sectional illustration of the seal pot in the embodiment of FIG. 5.
Figure 7:
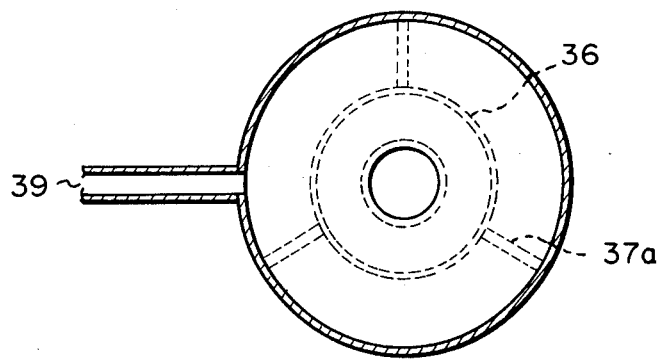

A pot 36 is provided in the central part of the cylindrical body 31 of the intermediate connecting section 30 using a part of the side wall of the intermediate connecting section 31 as one side wall thereof. A funnel 38 is formed over this pot 36 using a part of the side wall of the intermediate connecting section as one side wall thereof. The lower pipe of the funnel is received in the pot 36. Further, a drain duct 37 is provided at the bottom of the pot 36 so that the melt in the pot can be drained when desired and the inside of the pot can be cleaned. The detailed structure of the seal pot is shown in an enlarged views in FIGS. 2 and 3. The funnel can alternatively be constructed in an eccentric conical shape as shown in FIG. 4. Or otherwise the seal pot can be constructed independently from the intermediate connecting section wall as shown in FIGS. 5,6 and 7.

Usually the intermediate connecting section is provided with an inlet conduit 61 for introducing a chloride of the object metal, an inert gas, etc., and an exhaust conduit 62. These conduits can be provided in the retort proper, but it is more convenient to provide them in the intermediate connecting section 30.

These conduits have valves at positions not so far from the intermediate connecting section 30, and can be disconnected from the main conduit at positions outward of the valves. The conduit 61 on the right side in FIG. 1 is branched into two pipes, one for introduction of a metal chloride and the other for introduction of an inert gas.

Another conduit 39 is provided above the pot 36 (or above the funnel as shown in FIG. 4) in the intermediate connecting section 30 for introduction of the melt of a sealing material 80. And on the outside of the intermediate connecting section 30, a heating means, conveniently an electric resistance heater 70, is provided.

The above-mentioned reaction chamber, internal container, cooling chamber, and condensation cylinder can be made of mild steel or stainless steel.

The retort 10 is received in a suitable heating means 90 such as an electric resistance heating oven. The heating means is provided with an opening at the bottom thereof for the tapping pipe 13 of the reaction chamber 10. The heating means can be suitably designed by those skilled in the art, so the details thereof are not explained here.

The heating means of the intermediate connecting section 30 may conveniently be constructed in two semicircular pieces, so that it can easily be removed from the intermediate connecting section (if desired in three pieces). The intermediate connecting section 30 and the reaction chamber can be constructed in a simpler form. That is, the rim 12 of the retort can be omitted and the flange 11 can be lowered to the position of the rim 12 so that the intermediate connecting chamber is constructed in the form of a simple reel. In this case, however, a cooling means will be required for the interesting gasket. It is desirable to provide a heat insulating plate supported by a suitable supporting means under the seal pot suitably spaced therefrom in order to prevent direct radiation of heat to the pot from the reaction chamber.

This apparatus is operated as described below. The internal container 20 of the reaction chamber is charged with lumps of magnesium, and thereafter the intermediate connecting section is connected thereto by fixing the flanges 11, 22 and 35 with gaskets inserted therebetween. Then the condensation chamber (40+50) is connected in the same way and thus the whole apparatus is assembled. Connection of the condensation chamber is effected after the reaction chamber (together with the intermediate connecting section) has been placed in the heating means. The assembled apparatus is evacuated via the conduit 41 to test it for air tightness.

After the air tightness of the apparatus has been confirmed, an inert gas is introduced therein through the pipe 61 as being drawn out from the conduit 41 until the inside of the apparatus in pressurized to a pressure a little higher than atmospheric pressure, and then the valves are closed. Then the melt of a sealing material 80, magnesium for instance, is introduced into the pot 36 through the conduit 39 and the sealing material is solidified. Next the heating oven 90 is operated so as to heat the retort. After the magnesium in the retort has melted, a chloride of the object metal, titanium tetrachloride for instance, is introduced into the reaction chamber through the conduit 61 and the reaction starts. After the spongy metallic titanium has been formed in the retort, the formed magnesium chloride is drained out by opening the plug 14.

Then the plug 14 is closed and electric current is applied to the heating means 70 of the intermediate connection section 30 so as to heat the seal pot. The sealing material, that is, the magnesium, therein is melted and drains through the drain duct 37 and then the whole apparatus is evacuated through the conduit 41. The condensation chamber is cooled by circulating water through the jacket of the cooling chamber 40. At this stage, the reaction chamber and the condensation chamber are in communication with each other. Therefore, if the heating of the reaction chamber is continued, the magnesium chloride and the magnesium entrapped in the formed spongy metal are vaporized and separated from the metal and collected in the condensation cylinder 50.

After the vacuum separation has been finished, the apparatus is repressurized with argon, and a molten sealant is again introduced into the pot 36 through the conduit 39 and is solidified. It is desirable to introduce a small amount of argon into the apparatus through the conduit 61 during the sealing operation in order to prevent contamination of the formed metal with the vapor of the sealant material. After the reaction chamber and the condensation chamber has been sealed off from each other, the condensation chamber is separated from the intermediate connecting section, and the reaction chamber (together with the intermediate connecting section) is taken out of the heating oven and cooled. (At this stage, the base plate 23 and the cylindrical member 21 are weakly fixed together by the formed metal sponge.) After cooled, the reaction chamber is opened and the base plate is displaced from the cylindrical member and thus the formed metal sponge is recovered. This completes one batch operation.

When the next batch operation is started, the apparatus need only be simply assembled after being charged with metallic magnesium, since the passage of the intermediate connecting section 30 is already closed. The air in the reaction chamber is replaced with an inert gas introduced through the conduit 62, whereafter the next batch operation can be carried out.

An apparatus substantially as shown in FIG. 1 was assembled. The apparatus was made of ferritic stainless steel and had the following dimensions. Both the reaction chamber and the condensation chamber were of the bell shape measuring 700 mm in outer diameter and 1760 mm in height. The height (length) of the cylindrical body of the intermediate connecting section was 500 mm, and its internal diameter was 185 mm. The walls of the reaction chamber and intermediate connecting section, which are heated, were 25 mm thick. The seal pot 36 and the funnel 38 were made of 5 mm thick steel. The seal pot 36 was 140 mm along the center line of the oblique bottom wall, and 100 mm along the center line of the vertical cylindrical wall (that is, the wall of the intermediate connecting section). The conduit 37 was 25 mm in inner diameter. The funnel 38 was 100 mm in the length of the lower pipe and 100 mm in the vertical height of the oblique wall and 140 mm along the center line of the oblique wall.

Operation 1

Using the above described apparatus and following the above described operation steps, titanium was prepared. First of all, 350 kg of solid magnesium was placed in the internal container of the reaction chamber and argon was introduced into apparatus so that the apparatus was pressurized to a pressure a little higher than atmospheric pressure. The passage of the intermediate connecting section was closed with metallic magnesium and the retort was heated to 800°-850° C. to melt the magnesium placed therein. About 1020 kg of titanium tetrachloride was introduced into the retort dropwise so that the temperature did not rise so much. After the reaction was finished, the formed magnesium chloride was withdrawn through the tapping pipe 13 by opening the plug 14. Next the magnesium in the seal pot was melted and withdrawn through the drain duct 37, during which argon was circulated through the apparatus. Thereafter, the reaction chamber was heated to 1,000° C. as evacuation of the apparatus was continued for about 30 hours. Thus the vacuum separation was completed.

Again molten magnesium was introduced into the seal pot and solidified, and then the condensation chamber was removed and the reaction chamber (together with the intermediate connecting chamber) was taken out of the heating oven and opened. About 250 kg of spongy titanium was obtained.

Sealing with the solidified magnesium became imperfect after 10 batch runs. So the magnesium was melted and withdrawn through the duct 37 and the inside wall of the seal pot was cleaned as thoroughly as possible by inserting a ramrod through the duct. When magnesium was introduced and solidified, perfect sealing was regained.

Operation 2

In accordance with the above described operation steps, zirconium was prepared.

About 50 kg of magnesium was placed in the retort. Magnesium was used as the sealant. The retort was heated to 800°-850° C., and about 210 kg of zirconium tetrachloride was introduced as described above. After the reaction was finished, the passage of the intermediate connecting section was opened as described above, the retort was heated to 900°-950° C. while the evacuation of the apparatus was continued for about 20 hours. Thus the vacuum separation was effected. By operating in the same way as in the case of titanium, about 80 kg of zirconium was obtained.

After 13 batch operations, the sealing with magnesium became imperfect.

Example 2

FIG. 5 shows a second embodiment of the invention which is substantially the same as that described above with respect to FIG. 1 and corresponding parts are represented by the same reference numerals. Description on the corresponding parts will not be repeated here but only the characteristic differences will be described in detail.

The structure of the seal pot is simpler than in the previously described embodiment. In this embodiment, the pot 36 is a simple pot or pan supported by suitable supporting means 37a, and the funnel 38 is literally a funnel, the lower pipe of which is received in the pot 36. The intermediate connecting section per se is almost the same as the previously described one, but the flange at the bottom thereof extends farther to reach the inside wall of the retort 10, not the internal container 20.

The reaction chamber is also simpler. The internal container 20 is shorter than the previously described one and has no upper flange 11. Also it is constructed integrally of a cylindrical body and a base plate. Therefore, in this embodiment, the bottom flange 33 of the intermediate connecting section rests on the upper edge of the internal container 20 and contacts the inside wall of the retort 10.

The advantage of this embodiment is as follows. The construction cost is cheaper than the previously described. The internal container of the reaction chamber can be made of plain carbon steel which can be discarded for each batch operation. Depending on the kind of starting materials there is sometimes such considerable sticking of the formed spongy metal to the internal container that the internal container cannot be used again. When this fact is considered, employment of disposable internal containers may be preferable. The disadvantage is of course that the sealant must be vaporized instead of being melted. Moreover, the pot cannot be cleaned from outside.

It is obvious that the apparatus of this embodiment can be operated in the same way as that of the previously described one. So explanation and illustration on the operation thereof are not repeated.

INDUSTRIAL APPLICABILITY

This invention provides an improved apparatus for reduction of chlorides of high-melting point and high-toughness metals which is more convenient in use than the prior art apparatuses. This apparatus is immediately applicable to the manufacturing of titanium and zirconium, and it will be recognized among those skilled in the art that it will also be possible to advantageously employ this apparatus in any future-developed process for preparing a similar metal by reduction of its halide with an active metal (not only magnesium but also calcium, sodium, etc.)

We claim:

1. An apparatus for the preparation of high-melting-point high-toughness metals by reduction of chlorides thereof with an active metal which comprises a heatable and tightly closable reaction chamber, an evacuable and coolable condensation chamber for condensing the unreacted active metal and the formed chloride vaporized in the reaction chamber to separate these from the formed object metal, and an intermediate connecting section for communicating and sealing off the two chambers, wherein said apparatus comprises a seal pot closing means having a funnel provided in the intermediate connecting section and pot for fusible and vaporizable sealing material which receives the lower pipe of the funnel and the heating means for melting and vaporizing the fusible and vaporizable material, and wherein the pot of the seal pot structure is provided with a conduit with a valve means for the fusible and vaporizable material.

2. The apparatus as recited in claim 1, wherein the pot of the seal pot closing means is provided with a drain duct with a valve means.

3. The apparatus as recited in claim 2, wherein the pot has an oblique plane bottom.

4. The apparatus as recited in claim 3, wherein the drain duct is provided in a straight line with the oblique bottom plane of the pot.

5. The apparatus as recited in claim 4, wherein the valve means consists of a bush provided in the tapping pipe and a water-cooled plug.

6. The apparatus as recited in claim 4, wherein the intermediate connecting section has a flange outwardly extending from the bottom edge thereof, a short cylindrical wall concentric with the intermediate connecting section per se and smaller than said flange per se in diameter is provided on the upper surface of said flange, said wall is provided with a flange outwardly extending from the top edge thereof, the internal container comprises a cylindrical member and a base plate with at least one perforation and supporting legs, the cylindrical member is provided with a flange outwardly extending from the top edge thereof, the retort is also provided with a flange outwardly extending from the top edge thereof, and the flange of the retort, the flange of the cylindrical member of the internal container and the flange of the short wall of the intermediate connecting section are laid one over another with a gasket therebetween and fixed together, whereby the bottom flange of the intermediate connecting section is inserted in the cylindrical member and the outward periphery of the flange reaches the inside wall of the cylindrical member.

7. The apparatus as recited in claim 4, wherein the intermediate connecting section has a flange outwardly extending from the bottom edge thereof, a short cylindrical wall concentric with the intermediate connecting section per se and smaller than said flange per se in diameter is provided on the upper surface of the flange, said wall is provided with a flange extending from the top edge thereof, the internal container comprises a cylindrical member and a base plate with at least one perforation and supporting legs, the retort is provided with a flange outwardly extending from the top edge thereof, and the flange of the short wall of the intermediate connecting section is laid over the flange of the retort with a gasket inserted therebetween and fixed together, whereby the bottom flange of the intermediate connecting section is inserted into the retort and rests on the top edge of the cylindrical member of the internal container and reaches inside surface of the retort.

8. An apparatus for the preparation of high-melting point high-toughness metals by reduction of chlorides thereof with an active metal which comprises a heatable and tightly closeable reaction chamber, an evacuable and coolable condensation chamber for condensing the unreacted active metal and the formed chloride vaporized in the reaction chamber to separate these from the formed object metal, and an intermediate connecting section for communicating and sealing off the two chambers, wherein said apparatus comprises a sealing pot closing means having a funnel provided in the intermediate connecting section and a pot for fusible and vaporizable sealing material which receives the lower pipe of the funnel and a heating means for melting and vaporizing the fusible and vaporizable material, wherein the reaction chamber comprises a cylindrical bell-shaped outer retort and a cylindrical internal container, said retort having a drain duct provided with a valve means, and said internal container comprising a side wall member and a base plate, wherein the cylindrical member and the base plate are separate members.

* * * * *